May 8, 1934. V. H. WINQUIST 1,958,121
DRIVE MEANS
Filed June 13, 1931 5 Sheets-Sheet 1
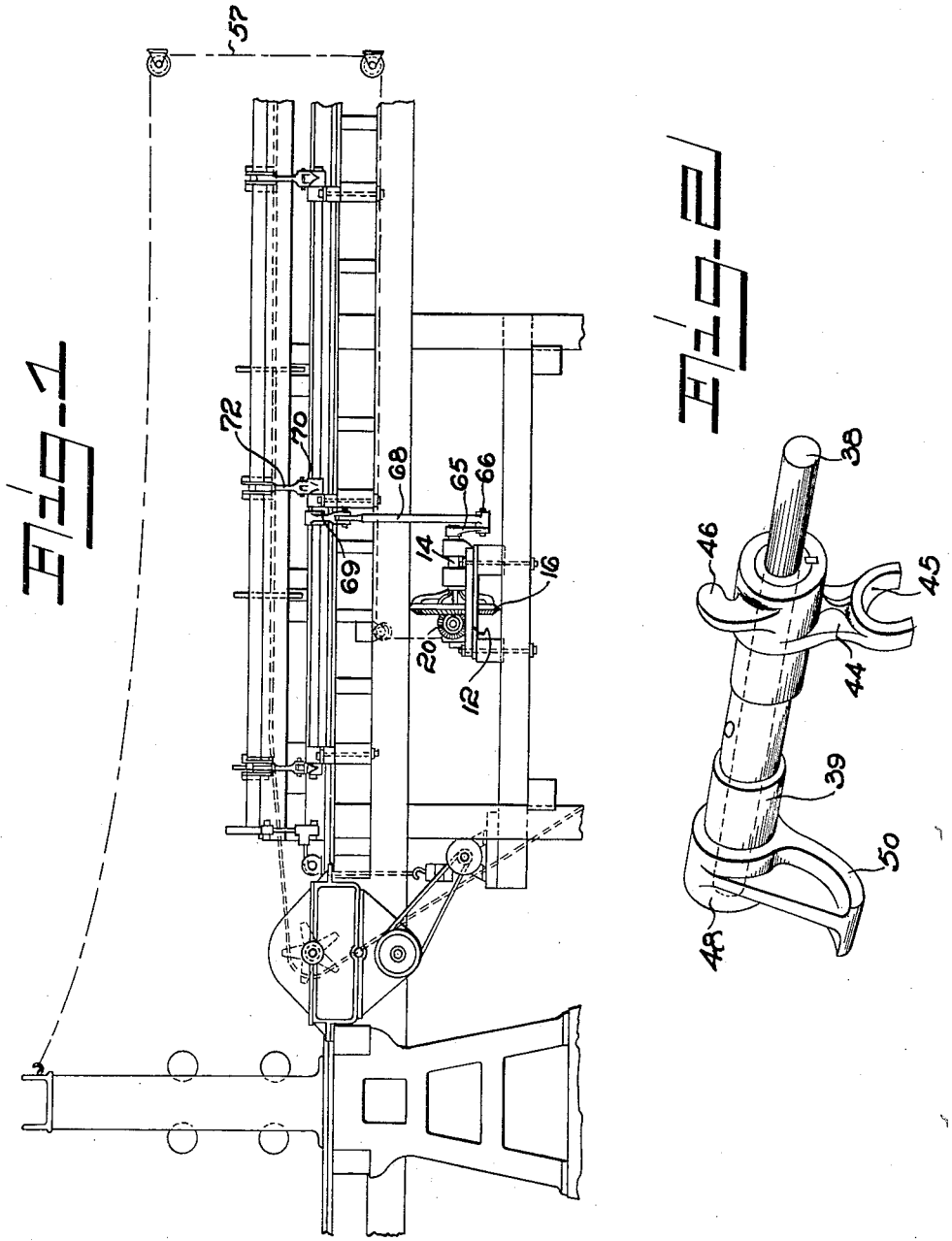
INVENTOR
Victor H. Winquist
BY
Smith & Tuck
ATTORNEYS May 8, 1934.  V. H. WINQUIST  1,958,121
DRIVE MEANS
Filed June 13, 1931   5 Sheets-Sheet 2

INVENTOR
Victor H. Winquist
BY Smith & Tuck
ATTORNEYS

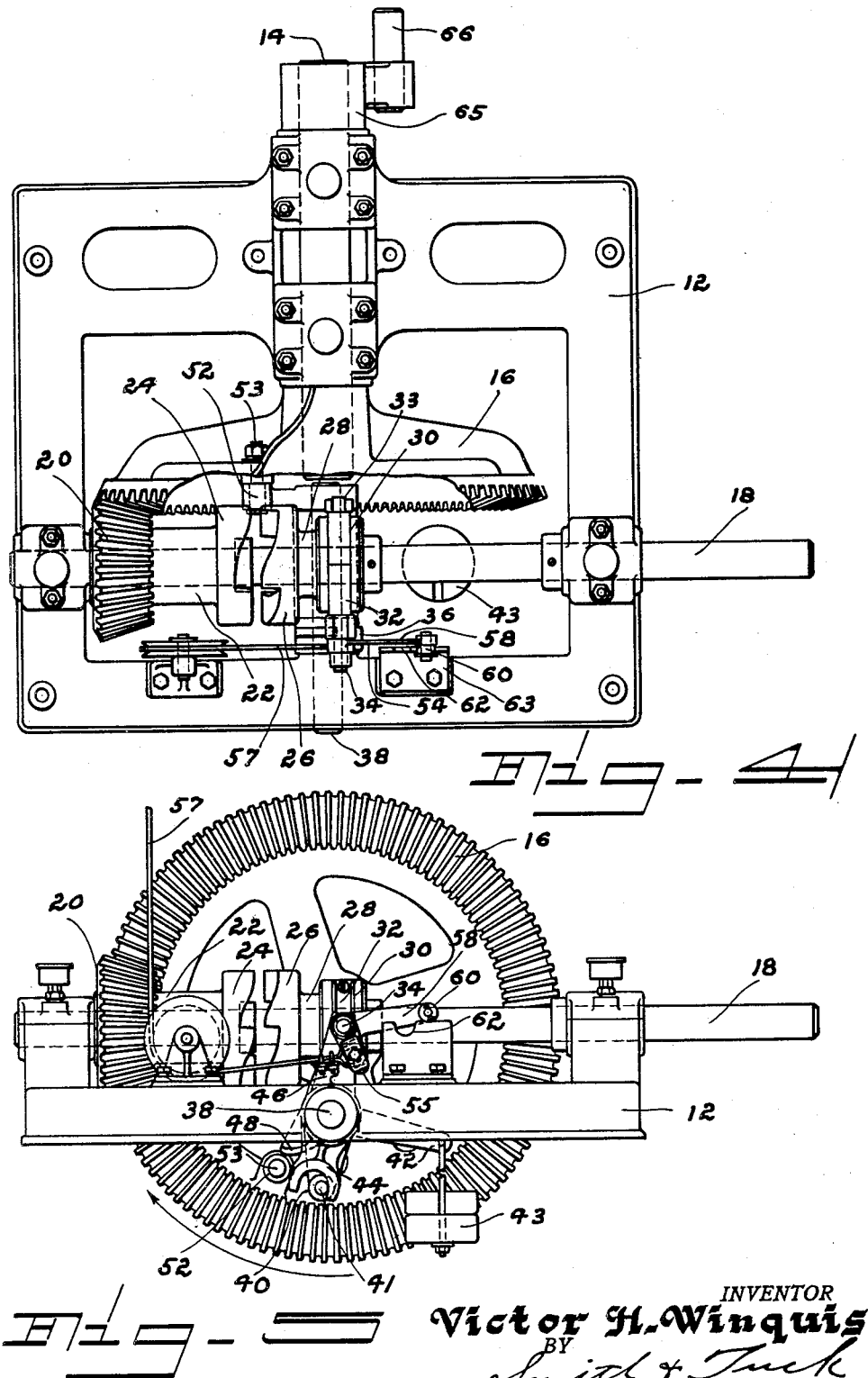

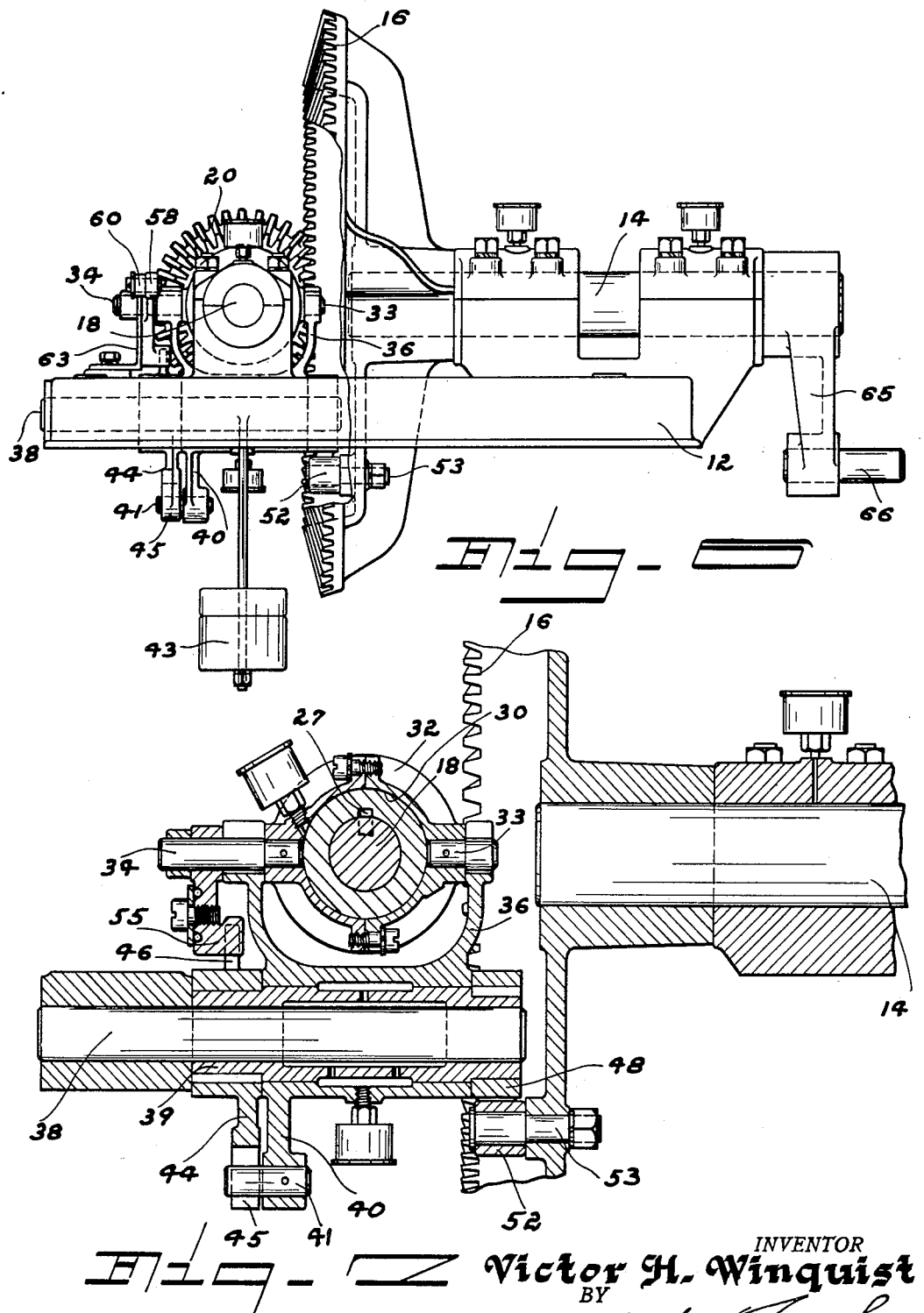

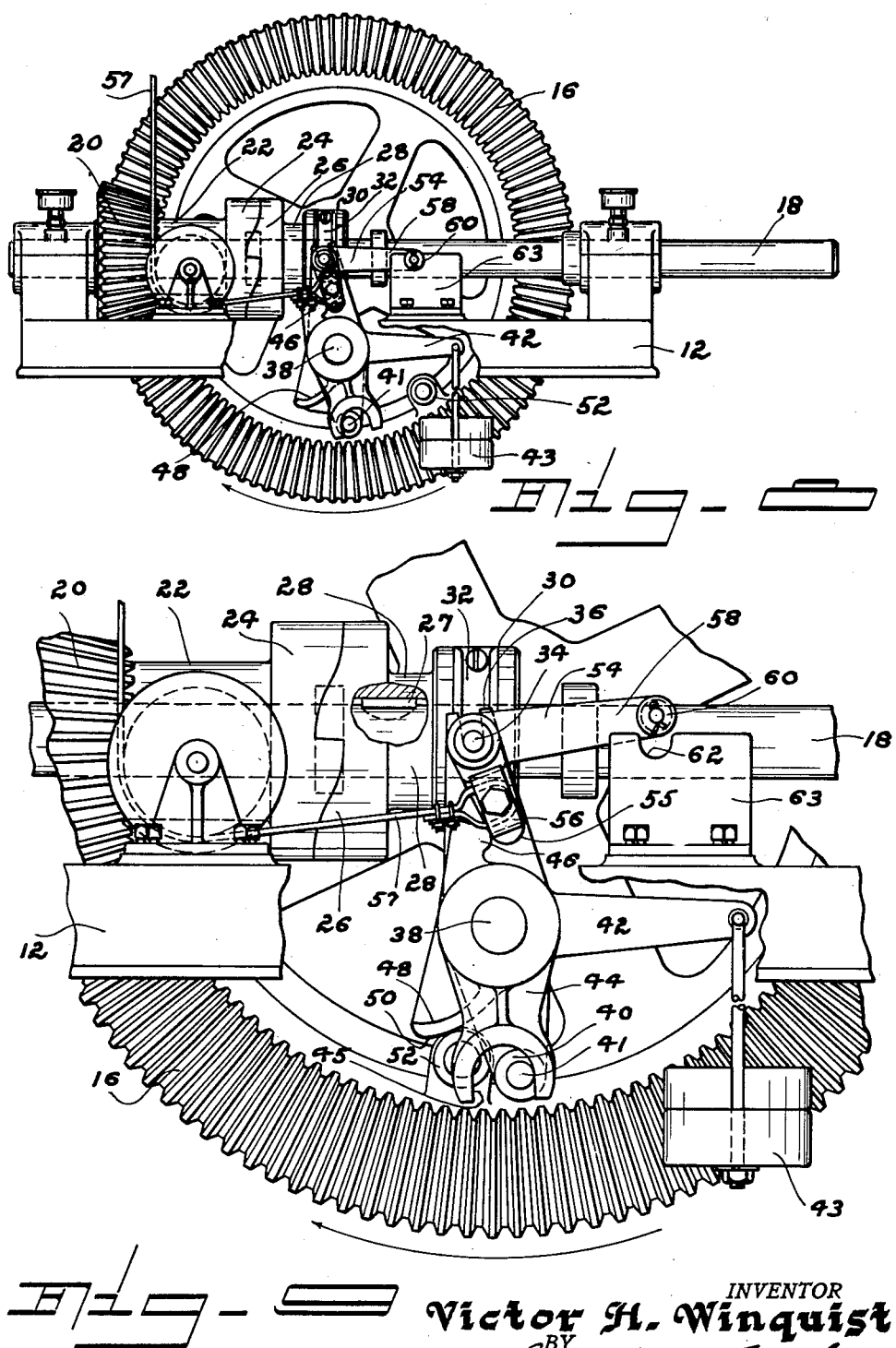

Patented May 8, 1934

1,958,121

UNITED STATES PATENT OFFICE 1,958,121

DRIVE MEANS

Victor H. Winquist, Seattle, Wash., assignor to Mill Engineering and Supply Company, Seattle, Wash., a corporation of Washington Application June 13, 1931, Serial No. 544,277

7 Claims. (Cl. 192—33)

My present invention relates to the art of intermittent motion mechanisms and more particularly to a drive means for use, for instance, in operating log kickers. I feel that I can more completely describe my invention by applying it to some specific industry as sawmill work, for instance, although I wish it understood that my drive means could be used in any instance where an intermittent drive is desired.

Steam operated mills naturally used steam cylinders to operate their log kickers, however, the modern sawmill is usually all electrically driven and when so operated, mechanical drive means must be substituted for the steam cylinder.

Log kickers as used in sawmills call for a heavy thrust for a short movement of the log engaging levers, and of course when one movement has been executed the mechanism must be retracted and held in position until a new log has been placed in proper position and the time has arrived to kick it onto the saw carriage, for instance. In operating a mechanism of this character the inertia of the log which is being moved is very great and the force that is applied, momentarily, of course, in the operation needs to be quite great. This sudden application of considerable force puts a great shock or jar on the drive means and in the past considerable difficulty has been experienced in having the drive mechanism remain in engagement during the full period of a single operation. In my present invention I have provided means for locking my mechanism together, during the period the mechanism is under its shock load, therefore The principal object of my invention is to provide a drive mechanism which will withstand a heavy shock load.

A further object is to provide means for locking such a mechanism and holding it in its locked position during its full cycle of operation.

A still further object is to provide means for easily engaging and disengaging my drive means.

Other and more specific objects will be apparent from the following description taken in connection with the accompanying drawings, wherein Figure 1 is a view of a typical installation of my drive means, the same being shown in side elevation.

Figure 2 is a perspective view showing certain cam members in detached views.

Figure 4 is a top plan view of the driving mechanism in its released position.

Figure 5 is an elevation of the same showing the mechanism in its released position.

Figure 6 is an end elevation with a portion of the gear broken away similar to Figure 4.

Figure 7 is a fragmentary sectional view taken along the line of the main shaft axis.

Figure 8 is a side elevation similar to Figure 5 with certain parts broken away and the mechanism shown in its engaged position.

Figure 9 is a fragmentary view similar to Figure 8 showing the beginning of the unlocking movement.

Figures 3, 10:
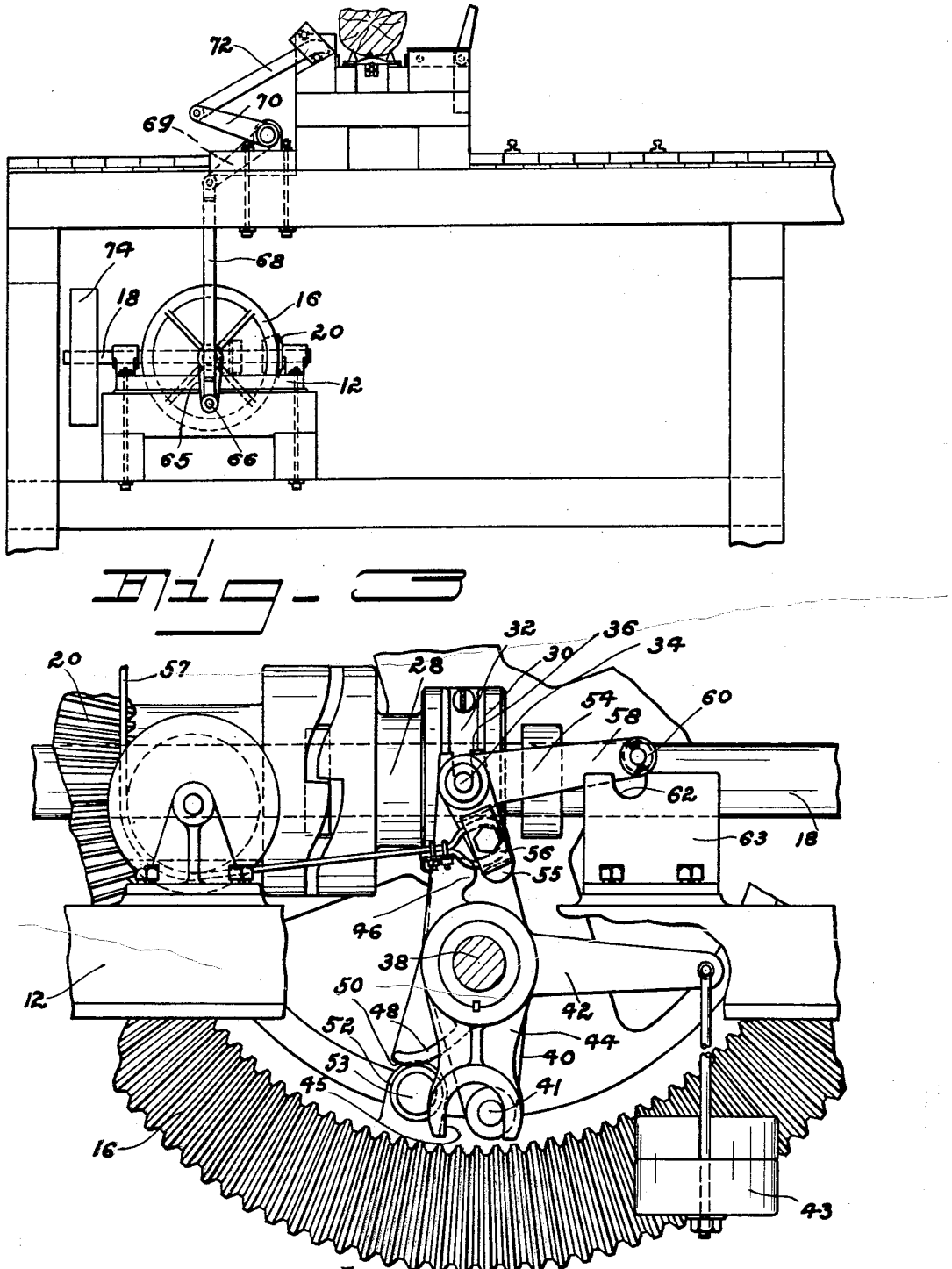
Figure 3 is an end elevation on a somewhat enlarged scale.
Figure 10 is a view showing a further step in the unlocking movement.

Referring to the drawings, throughout which like reference characters indicate like parts, numeral 12 designates the base of my drive mechanism. This is adapted to journal the main or crank shaft 14. This is suitably journaled in long bearings so that the driven gear 16 may overhang. Disposed at right angles to shaft 14 is the drive shaft 18. This is suitably journaled in bearings secured to base 12 and has mounted thereon the drive pinion 20 which is adapted to engage gear 16. In my present showing I indicate the bevel gear arrangement composed of the gears 16 and 20. I wish it to be understood, however, that a similar driving mechanism can easily be arranged for any form of gearing it might be desired to use, for instance, worm gearing or any form of spur gearing might be used with slight changes.

The pinion 20 is formed as part of member 22. This member I prefer to provide with a suitable bushing so that it will be free to revolve upon shaft 18 and to further provide at the end opposite from the pinion, part of a dental or jaw clutch 24. Also disposed on shaft 18 but adapted to slide thereon is the other half of the clutch as 26. This member I prefer to slidably secure to shaft 18 by any of the well known means such as by splining shaft 18 or by the use of a squared portion or by use of a key 27 so that the member to which clutch member 26 is secured will be free to move longitudinally of shaft 18 but must revolve with it. Clutch member 26 is formed as part of the sliding member 28 which has at one end an annular groove 30 in which is disposed the clutch ring 32. This member is more clearly shown, perhaps, in Figure 7 and is held against rotation, but is provided with sufficient clearance so that member 28 can rotate freely. The exact construction of the clutch ring is a matter of individual design. Any of the well known shifter yokes might be used. In the form shown I have provided the clutch ring with outwardly extending pins 33 and 34 which are adapted to be engaged by the shifting fork 36.

Shifting fork 36 is mounted for oscillation upon a stub shaft 38 which is fixedly secured as by pressing or shrinking, usually at one end only in base member 12. This construction is probably best shown in Figure 7. As a matter of convenience I prefer to mount the shifter fork upon a bushing 39 which is free to rotate upon shaft 38 and upon which in turn shifter fork 36 is free to rotate. Shifter fork 36 has a downwardly extending arm member 40 carrying an operating pin 41 and has further formed as a part of it a substantially horizontally disposed counter balance arm 42. This I provide with a counter weight 43 which provides the energy necessary to urge the clutch mechanism out of engagement and to maintain it in its released position so there will be no tendency for vibration or the like to cause the jaw clutch members to engage. It should be apparent, I believe, that the same effort could be applied through a spring, for instance, in which case, arm 42 would not need to be in a horizontal position. Fixedly secured to bushing 39 as by keying thereto is the operating lever 44. This is provided at its lowermost end with a U-shaped yoke 45 which should be made with a radius considerably larger than the operating pin 41. At the upper end of lever 44 is a camlike member 46.

Secured to the opposite end of bushing 40 by shrinking or keying thereon is cam 48. The cam surface 50 is so positioned as to be in the path of roller 52 which is journaled on pin 53, which in turn is fixedly secured to gear 16.

Pivotally mounted upon pin 34 is the locking lever 54. This member has a downwardly extending arm portion 55 which in coaction with washer 56 is adapted to form a point of attachment and the securing means for operating cable 57. Lever 54 has another arm portion 58 disposed substantially in a horizontal position which has secured at its outermost end a revolvable roller 60. Roller 60 is so positioned as to engage a notch 62 in a locking bracket 63. Bracket 63 may be formed as part of base 12 but is preferably made as a separate piece and secured to said base.

Secured to shaft 14 is a crank member 65 which has secured to it a pin 66. Journaled upon pin 66 may be any suitable connecting rod as 68. In the showing I have made, I link rod 68 by means of the pivoted arms 69 and 70 to the log kicker 72. It will be apparent, I believe, that any suitable power transmitting means might be connected to shaft 14 in place of the crank member 65. In my showing I have not indicated any particular power transmitting means as connected to the driving shaft 18. This connection might take any suitable form; a motor might be directly connected to it or power might be applied thereto as by a belt pulley suitably mounted thereon.

*Method of operation*

Assuming that my mechanism has been connected to a log kicker after the showing of Figures 1, 2 and 3, if it is desired to operate the log kicker 72 the operator pulls cable 57. This cable should be conveniently arranged. In Figure 1 I have indicated the same with a dot-and-dashed line. When the operator pulls cable 57 the mechanism would normally be in its disengaged position as shown in Figures 4 and 5. Now, it must be remembered that locking lever 54 is pivotally supported on pin 34 so any tension on line 57 tends to urge roller 60 downwardly. This motion cannot be accomplished at the beginning, however, because of the interference of bracket 63 so the only possible movement is to move pin 34 to the left as indicated in Figure 5. This revolves through a partial revolution the shifting yoke 36 about shaft 38 and causes an engagement between the two halves 24 and 26 of the jaw clutch. As the jaws come into full engagement, however, the downward thrust on roller 60 causes it to swing into notch 62 and thereby lock the mechanism with the jaw clutch, in the engaged position and the mechanism is in a position to transmit its power without any fear of the jaw clutch members working loose and disengaging.

The U-shaped yoke 45 will then engage pin 41 as indicated in Figure 8.

Now, let it be assumed that almost one complete revolution of shaft 14 is completed. This will bring roller 52 to the position as indicated in Figure 8 with all the mechanism still locked against movement. As roller 52, however, progresses a little further we have the condition shown in Figure 9. In this case the roller has engaged cam surface 50 and has carried the cam through a fraction of a revolution. Now, it should be remembered that the cam is secured to the hollow shaft or bushing 39 which also has secured to it the lever 44. Lever 44 has the upwardly extending releasing cam 46 which now operates against the lower extending portion 55 of the locking lever 54. This action revolves this member sufficiently to raise roller 60 out of its locking notch 62. The mechanism is now free so that the jaw clutch members can disengage. This is accomplished by the U-shaped yoke engaging pin 41 in the manner indicated in Figures 9 and 10 as distinguished from that shown in Figure 8. Further movement of cam 50 by roller 52 carries pin 41 with it and by that means partially revolves the shifting fork 36. This movement is sufficient to entirely disengage the jaw clutch members and allow weight 43 to complete the necessary movement or at least to hold the parts in the disengaged position.

While the description of this movement may seem a little involved its actual operation is very quick, it being essential, however, that parts be so proportioned and adjusted that the outlined sequence of operations occur in the order stated. In other words, it is first necessary to unlock the mechanism with certainty before applying the force which disengages the jaw clutch members from each other.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

What I claim is:

1. Drive means consisting of a drive shaft; a drive gear journaled on said drive shaft; a clutch member secured to said drive gear; a second clutch member slidably secured to said drive shaft; a shifter adapted to move the second clutch member longitudinally of the drive shaft in a manner to engage the first named clutch member or to disengage the same; means adapted to move said shifter to engage the clutch members; positive locking means adapted to lock the clutch members together when they are in the engaged position, said locking means consisting of a locking lever pivotably supported upon the shifter and having an outwardly extending pin; a locking bracket adapted to receive said pin in a manner to lock the lever when the clutch members are in the engaged position; and clutch disengaging means adapted to first release the locking means and then to move the shifter in a manner to disengage the clutch members.

2. Drive means consisting of a base; a drive shaft journaled on said base; a drive gear journaled on said drive shaft; a clutch member secured to said drive gear; a second clutch member slidably secured to said drive shaft; a shifting fork adapted to move the second clutch member longitudinally of the drive shaft in a manner to engage the first named clutch member or to disengage the same; means adapted to move said fork to engage the clutch members; positive locking means adapted to lock the shifting fork when the clutch members are in the engaged position, said locking means consisting of a locking lever pivotably supported upon the shifting fork and having an outwardly extending pin; a locking bracket having thereon a notch adapted to receive said pin in a manner to lock the lever when the clutch members are in the engaged position; and clutch disengaging means adapted to first release the locking means and then to shift the fork in a manner to disengage the clutch members.

3. Drive means consisting of a base; a drive shaft journaled on said base; a drive bevel gear journaled on said drive shaft; a clutch member secured to said drive gear; a second clutch member slidably secured to said drive shaft; a pivoted shifting fork adapted to move the second clutch member longitudinally of the drive shaft in a manner to engage the first named clutch member or to disengage the same; means adapted to revolve said fork to engage the clutch members; pivotably supported locking means adapted to positively lock the shifting fork when the clutch members are in the engaged position, said locking means consisting of a locking lever pivotably supported upon the shifting fork and having an outwardly extending pin; a locking bracket having thereon a notch adapted to receive said pin in a manner to lock the lever when the clutch members are in the engaged position; and clutch disengaging means consisting of a pivotably supported operating lever, journaled co-axially with said shifting fork, adapted to first engage the locking lever in a manner to unlock the same and then to engage the shifting fork in a manner to partially revolve it and disengage the clutch members.

4. Drive means consisting of a base; a drive shaft journaled on said base; a drive gear journaled on said drive shaft; a clutch member secured to said drive gear; a second clutch member slidably secured to said drive shaft; a pivoted shifting fork adapted to move the second clutch member longitudinally of the drive shaft in a manner to engage the first named clutch member or to disengage the same; means adapted to move said fork to engage the clutch members; positive locking means adapted to lock the shifting fork when the clutch members are in the engaged position, said locking means consisting of a locking lever pivotably supported upon the shifting fork and having an outwardly extending pin; a locking bracket having thereon a notch adapted to receive said pin in a manner to lock the lever when the clutch members are in the engaged position; clutch disengaging means consisting of a pivotably supported operating lever adapted to first engage the locking lever in a manner to unlock the same and then to engage the shifting fork in a manner to partially revolve it and disengage the clutch members; and means adapted to urge the second clutch member out of engagement with the first named clutch member and maintain it in the released position.

5. Drive means consisting of a base; a drive shaft journaled on said base; a drive gear journaled on said drive shaft; a clutch member secured to said drive gear; a second clutch member slidably secured to said drive shaft; a shifting fork adapted to move the second clutch member longitudinally of the drive shaft in a manner to engage the first named clutch member or to disengage the same; means adapted to move said fork to engage the clutch members; locking means adapted to positively lock the shifting fork when the clutch members are in the engaged position, said locking means consisting of a locking lever pivotally supported upon the shifting fork and having an outwardly extending pin; a locking bracket having thereon a notch adapted to receive said pin in a manner to lock the lever when the clutch members are in the engaged position; and clutch disengaging means consisting of a pivotably supported operating lever adapted to first engage the locking lever in a manner to unlock the same and then to engage the shifting fork in a manner to partially revolve it and disengage the clutch members.

6. Drive means consisting of a base; a drive shaft; a drive gear journaled on said drive shaft; a clutch member secured to said drive gear; a sliding clutch member slidably secured to said drive shaft; locking means adapted to positively lock the clutch members together when they are in the engaged position, said locking means consisting of a locking lever pivotably supported and having an outwardly extending pin; a locking bracket adapted to receive said pin in a manner to lock the lever when the clutch members are in the engaged position; clutch disengaging means adapted to first release the locking means and then to move the shifter in a manner to disengage the clutch members; a shifter fork adapted to shift the sliding clutch member and mounted for a limited rotary movement in the plane of the drive shaft; a bushing adapted to journal said shifter fork and having ends extending outwardly beyond said shifter fork; a cam secured to one end of said bushing; an operating lever secured to the opposite end of said bushing, said lever having an upwardly extending cam-like member adapted to release the locking lever and having a downwardly extending U-shaped yoke portion; a downwardly extending arm formed as part of the shifter yoke; an operating pin secured to said arm having an outwardly extending end portion disposed within said U-shaped yoke; and a pin secured to an element rotated by said drive gear adapted to engage said cam and operate the disengaging means.

7. Drive means consisting of a base; a drive shaft journaled on said base; a drive gear journaled on said drive shaft; a clutch member secured to said drive gear; a second clutch member slidably secured to said drive shaft; a shifting fork adapted to move the second clutch member longitudinally of the drive shaft in a manner to engage the first named clutch member or to disengage the same; means adapted to move said fork to engage the clutch members; locking means adapted to positively lock the shifting fork when the clutch members are in the engaged position, said locking means consisting of a locking lever pivotably supported upon the shifting fork and having an outwardly extending pin; a locking bracket having thereon a notch adapted to receive said pin in a manner to lock the lever when the clutch members are in the engaged position; and clutch disengaging means consisting of a bushing adapted to journal said shifter fork and having ends extending outwardly beyond said shifter fork; a cam secured to one end of said bushing; an operating lever secured to the opposite end of said bushing, said lever having an upwardly extending cam-like member adapted to release the locking lever and having a downwardly extending U-shaped yoke portion; a downwardly extending arm formed as part of the shifter yoke; an operating pin secured to said arm having an outwardly extending end portion disposed within said U-shaped yoke; a pin secured to an element rotated by said drive gear and adapted to engage said cam; and counter balancing means adapted to urge said second cam member into its disengaged position.

VICTOR H. WINQUIST.